(12) United States Patent
Maiterth et al.

(10) Patent No.: US 6,471,550 B2
(45) Date of Patent: Oct. 29, 2002

(54) SMART CARD CONNECTOR FOR TWO SMART CARDS

(75) Inventors: Eduard Maiterth, Heilbronn; Manfred Reichardt, Weinsberg, both of (DE)

(73) Assignee: Amphenol-Tuchel Electronics GmbH (DE)

(*) Notice: Subject to any disclaimer, the term of this patent is extended or adjusted under 35 U.S.C. 154(b) by 0 days.

(21) Appl. No.: 09/985,540

(22) Filed: Nov. 5, 2001

(65) Prior Publication Data
US 2002/0055291 A1 May 9, 2002

(30) Foreign Application Priority Data

Nov. 3, 2000 (DE) .......................... 100 54 605
Dec. 6, 2000 (DE) .......................... 100 60 650

(51) Int. Cl.[7] .............................................. H01R 24/00
(52) U.S. Cl. ...................... 439/631; 439/326; 439/630
(58) Field of Search ................................. 439/188, 630, 439/326, 637, 631

(56) References Cited

U.S. PATENT DOCUMENTS

| 5,603,629 | A | * | 2/1997 | DeFrasne et al. ............ 439/326 |
| 5,813,878 | A | * | 9/1998 | Kuwata et al. ............. 439/326 |
| 6,149,466 | A | * | 11/2000 | Bricaud et al. ............. 439/326 |
| 6,241,545 | B1 | * | 6/2001 | Bricaud et al. ............. 439/326 |
| 6,241,557 | B1 | | 6/2001 | Reichardt ................... 439/637 |

* cited by examiner

*Primary Examiner*—P. Austin Bradley
*Assistant Examiner*—Briggitte R. Hammond
(74) *Attorney, Agent, or Firm*—Blank Rome LLP

(57) ABSTRACT

A smart card connector for two smart cards, in particular SIM cards, is provided. The smart card connector comprises a first contact support for contacting a first SIM card and a second contact support in the form of a cover carrying a second set of contact elements for contacting said second SIM card. Means are provided for linking the first contact support and the cover.

26 Claims, 8 Drawing Sheets

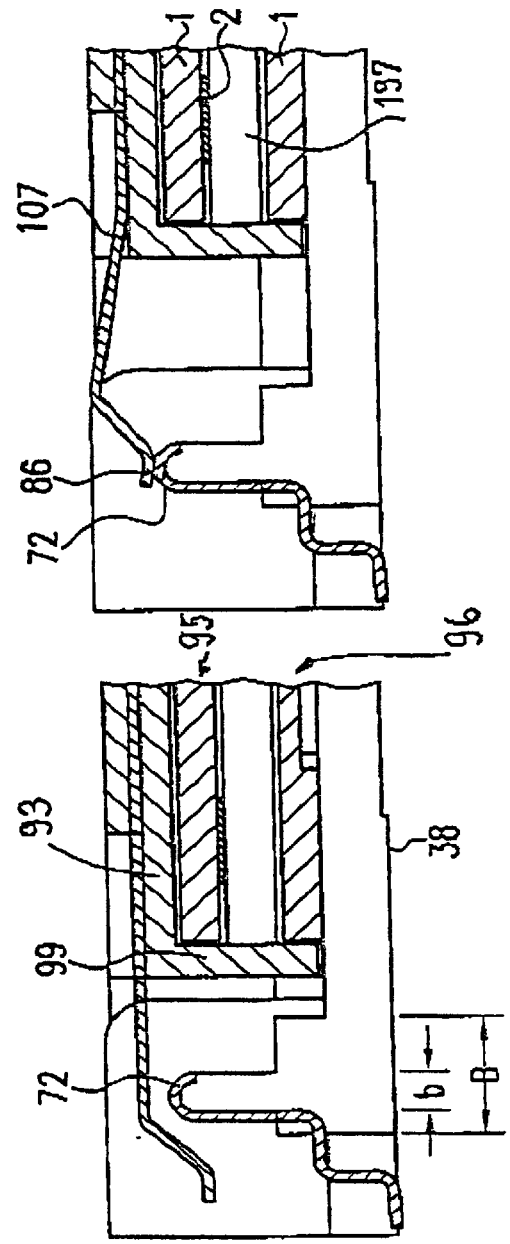
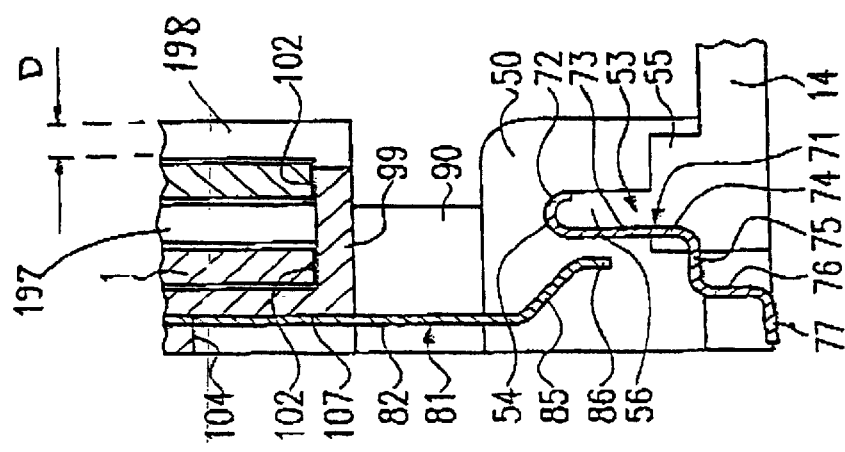

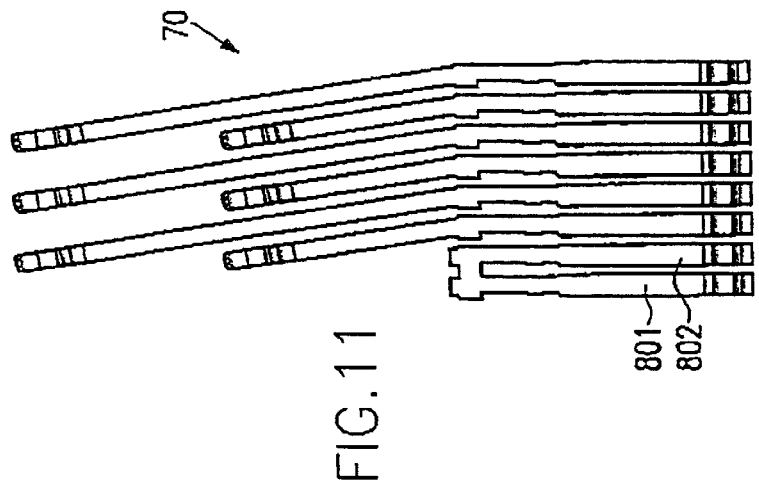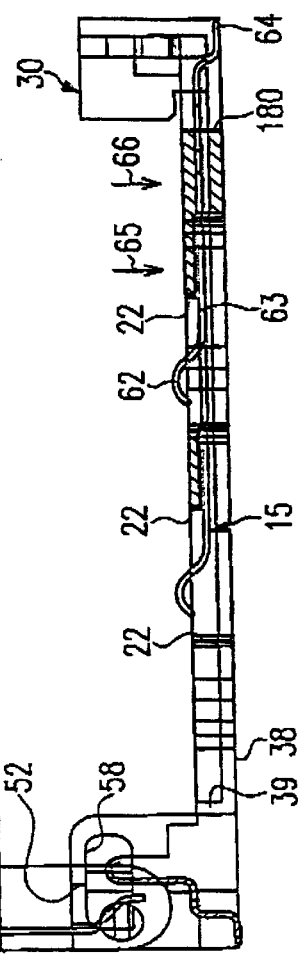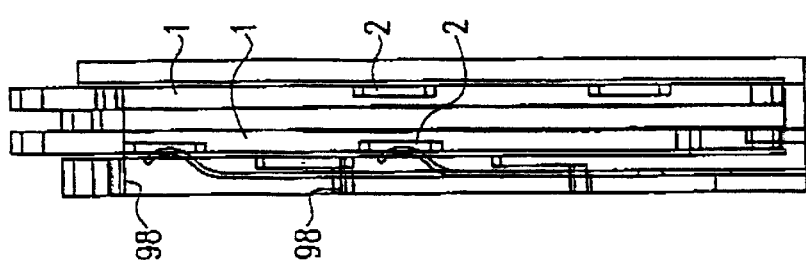

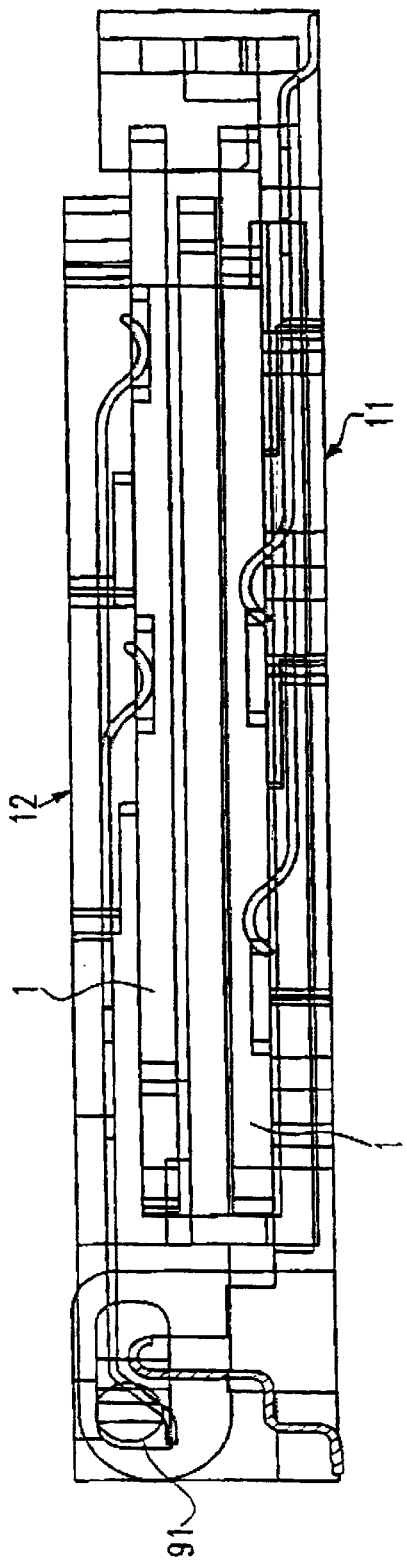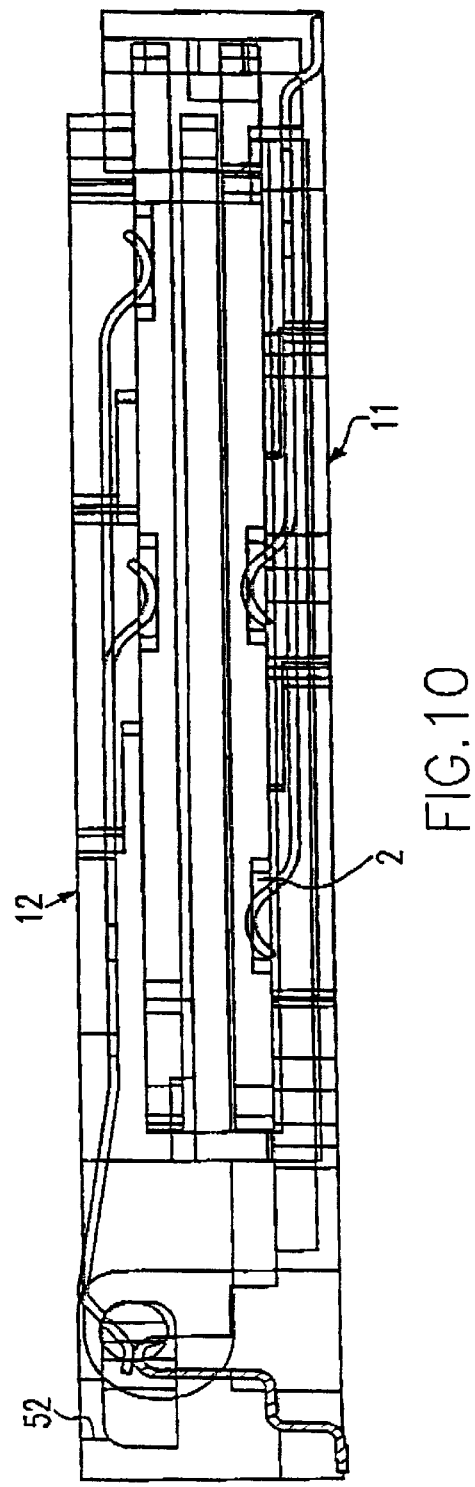

SMART CARD CONNECTOR FOR TWO SMART CARDS

The invention relates to a smart card connector for two smart cards. The invention relates in particular to a smart card connector for two SIM cards.

Smart card connectors for two smart cards and also for SIM cards, are already known. See for instance DE-199 13 923 A1. Smart card connectors are used for a plurality of applications, for instance in mobile telephones, in payment systems and so on. It is frequently necessary that more than one smart card connector needs to be used. DE-199 13 923 A1 discloses a smart card connector where the smart card is a SIM card. Two SIM cards can be inserted by means of a slider. The handling or actuating portion of the slider is part of the outer wail of the apparatus or else the handling or actuating part has to be mounted behind such outer wall of the apparatus. The fact that the handling portion is part of the outer wall of the apparatus, is disadvantageous in so far as it influences the design of the housing of the apparatus. Another disadvantage is that the slider can get lost.

It is an object of the present invention to provide a smart card reader which is very small. A further object of the invention is to provide a smart card reader which is accessible from above. A still further object of the invention is to provide a smart card reader which provides for a secure and precise contact to the card contacts of the smart card(s) and can be manufactured at low cost.

In accordance with the present invention a smart card connector adapted to receive two smart cards comprises:

a first contact support, within which a set of first contact elements is arranged adapted to contact card contacts of a first smart card;

a second contact support or cover, within which a second set of contact elements is arranged adapted to contact card contacts of a second smart card; hinge means for pivotally and slideably mounting said second contact support at said first contact support so that a) the second contact support can be pivoted from an open position extending upwardly with respect to the first contact support into a closed position, in which the second contact support is located adjacent to said first contact support and b) the second contact support can be moved from the closed position into a locked position, wherein first and second contact supports are locked with each other.

The second contact support or cover comprises two, a first and a second card receiving spaces, adapted to receive said first and said second smart card, respectively, with the card contacts of the first smart card facing in the closed and in the locked positions of said first and second contact supports towards the first set of contact elements, while the card contacts of said second smart card face towards the contact elements in said second contact support.

The smart card connector is provided with locking means comprising first contact support locking means and second contact support or cover locking means.

The first contact support comprises two longitudinally opposite ends. At a first end, the first contact support is provided with said first contact support hinge means adapted to cooperate with said second support or cover hinge means provided at a first of two oppositely longitudinally spaced ends of the cover. Together, the first and second contact support hinge means for the hinge means referred to above.

Due to this design there is access to the smart card reader from above and the smart cards can be inserted into the second contact support (cover), which is then pivoted into its closed position and is slideably moved into its locked position at the first contact support.

The second set of contact elements supported by the cover comprises "floating termination ends", which are adapted to contact a third set of contact elements also mounted in said cover. Said contact elements of said third set of contact elements have ends adapted to contact said termination ends of said second set of contact elements and also termination ends, which are adapted to form SMT contacts for the connection with pads on the circuit board. Said second set of contact elements and said first set of contact elements being preferably arranged such that only in a locking position of the cover the termination ends of said second set of contact elements are in contact with said connecting ends of said third set of contact elements.

In contrast to a smart card connector according to DE 199 13 923 A1, also called a SIMLOCK (trademark), according to the present invention, the smart cards inserted into the cover are moved together with the cover at the time the cover is moved into its locking position. However, this does not have to be necessarily so. When carrying out the locking of the cover at the first contact support, i.e. when sliding the cover from the closed position of the cover towards the locking position, the first card slides along the contact cusps of the first set of contact elements and the second card slides along the contact cusps of the second contact elements for a distance corresponding to the path from the closing position to the locking position.

In the first contact support a polarizing inclination is provided for the first smart card. If the first smart card is not inserted in the proper manner, then the cover cannot be locked to the first contact support. For the second smart card the cover is provided with a polarizing inclination. Here, an erroneously inserted card cannot be completely inserted and the cover cannot be locked.

The first contact support is provided with abutment means. The abutment means make it impossible that erroneously inserted smart cards can be locked. The abutment means further avoid a movement of the smart cards out of the cover when the cover is locked with the first contact support.

Preferably, the cover is provided in its closed, i.e. not yet locked Condition, with a pre-locking position, in which the smart card connector is adapted for "picking and placing" and also for the reflow soldering process.

In accordance with another embodiment of the invention the smart card connector is provided with a switch, which senses the locking position of the cover. Two additional contact elements are provided for this purpose in the cover. These two contact elements are stamped together with the second contact elements and preferably form together with two additional contact elements adjacent to the third set of contact elements a short-circuit bridge, when the locking position is reached.

The foregoing and other objects, features and advantages of the invention as well as a presently preferred embodiment will become more apparent from a reading of the following description in connection with the accompanying drawings in which:

FIG. 5 is a cross-sectional view along line V—V in FIG. 2, however with the cover being shown in its opened position;

FIG. 6 is a sectional view along line V—V in FIG. 2 with the cover being closed but not yet locked;

FIG. 7 is a sectional view along line V—V in FIG. 2, however, with the cover being in its locked position;

FIG. 8 is a rather schematic sectional view of the SIM card connector of FIG. 1;

FIG. 9 is a rather schematic view of the SIM card connector of FIG. 2 with the card contacts cusps of the smart or SIM card being shown (it should, however, be noted, that the contact casks of the contact elements should actually be shown on top of the card contacts of the smart card;

Figure 3:
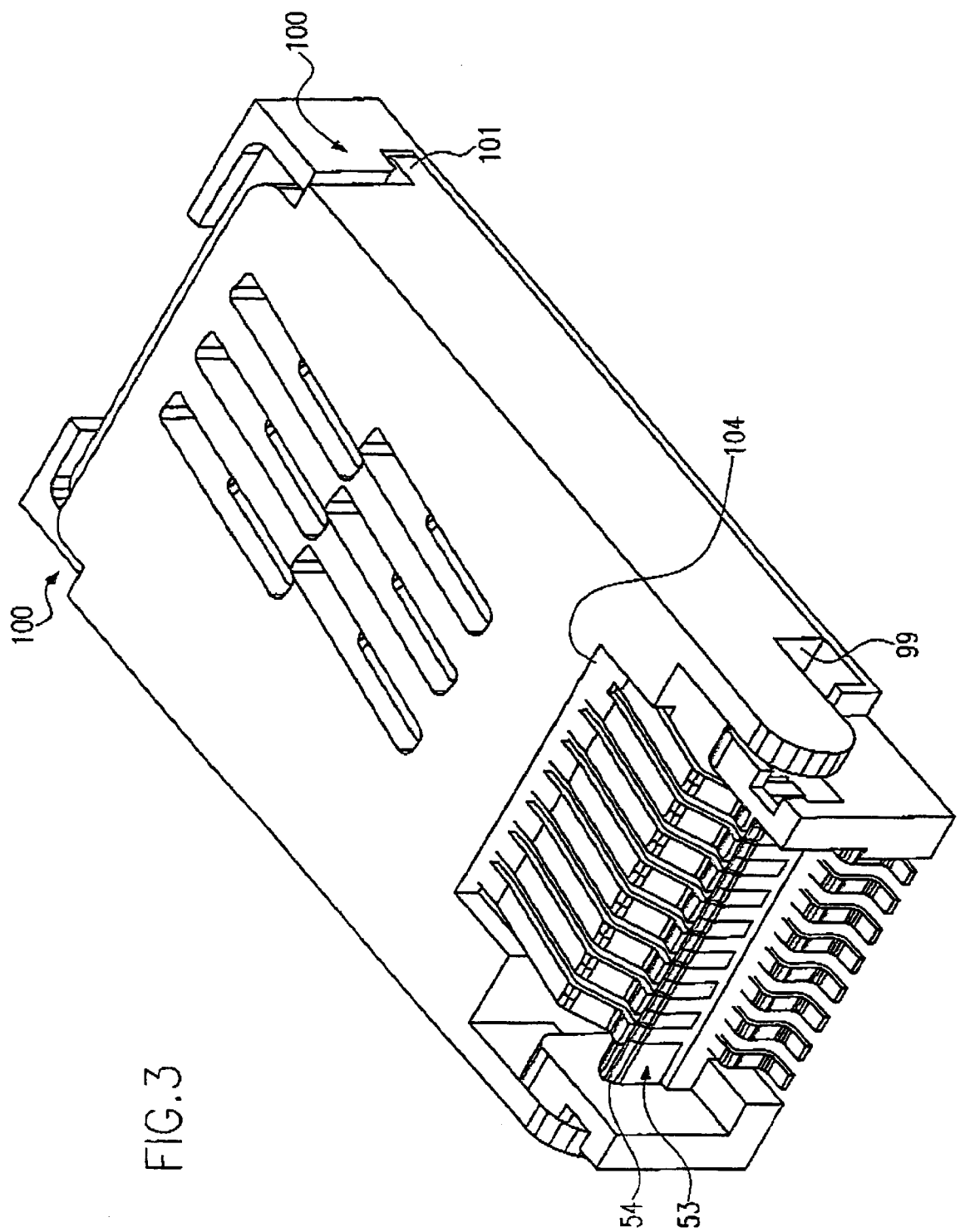
FIG. 3 is a perspective view of the SIM card connector of FIGS. 1 and 2 with the cover being in its locked position in which the locking switch is closed.
Figure 14:
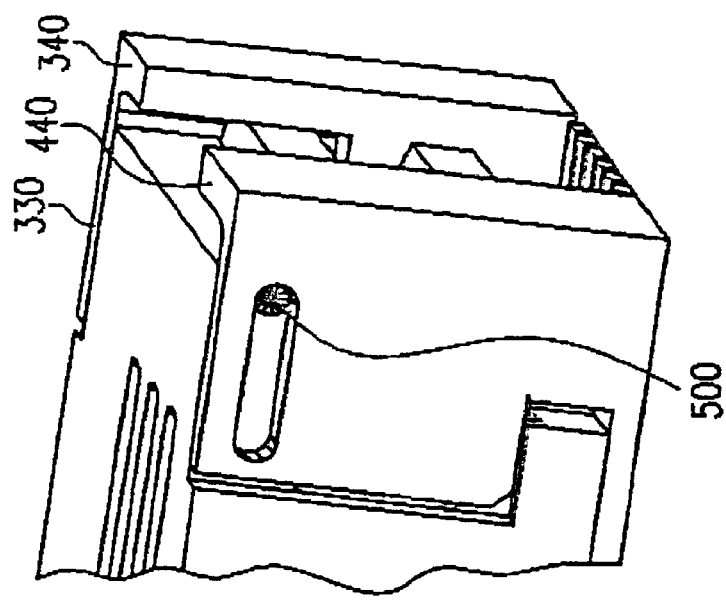
Figure 13:
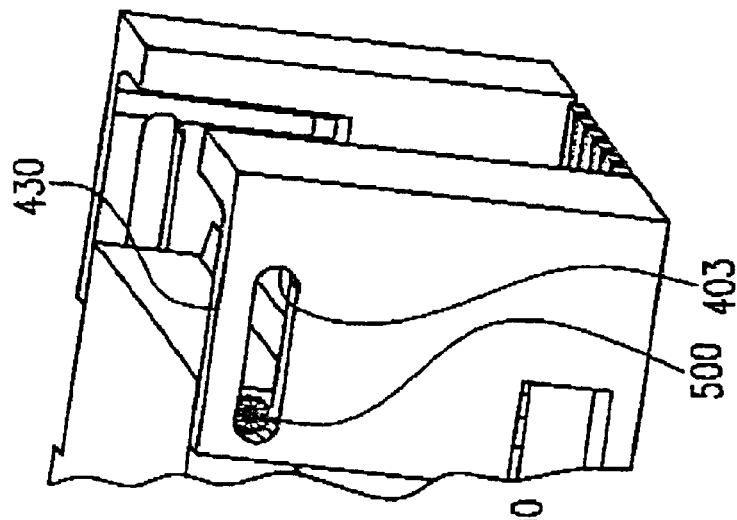
Figure 12:
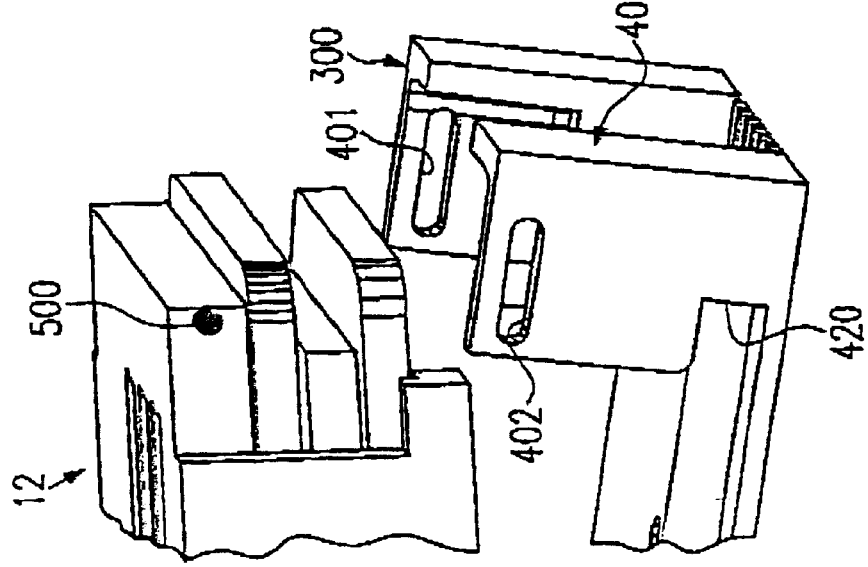

FIG. 10 a rather schematic sectional view of the SIM card connector of FIG. 3;

FIG. 11 is a top plan view of the set of contact elements to be carried by the cover;

FIGS. 12–14 perspective partial views of a second embodiment of the invention according to which means are provided so as to fix the cover in a closed but not yet locked condition in a so-called pre-locking position, with FIG. 12 showing the embodiment with the cover being open; FIG. 13 disclosing the cover in a closed but not yet locked position, and FIG. 14 showing the cover in its closed and locked position.

Figure 1:
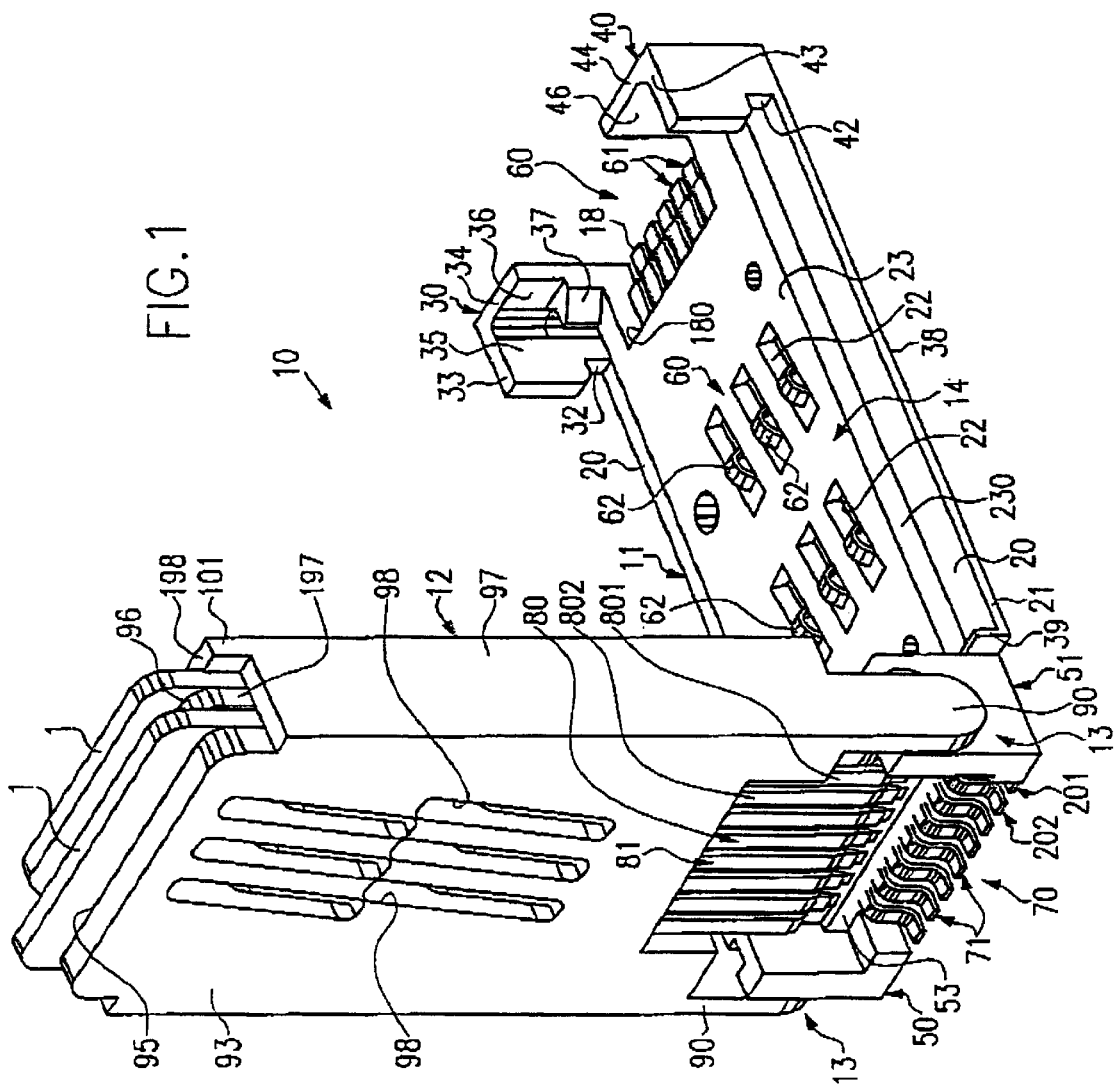
FIG. 1 is a perspective view of a SIM card connector in accordance with a first embodiment of the invention comprising a first contact element support and a second contact element support in the form of a cover in an opening position.

FIG. 1 and also FIGS. 2 through 11 disclose a preferred embodiment of a smart card connector 10 of the invention in the form of a SIM card connector 10. The SIM card connector 10 can also be called a "SIMLOCK (R). The smart card connector 10 is adapted to receive two smart cards 1 in the form of SIM cards.

The SIM card connector 10 comprises a generally stationary or first contact support 11. Movably mounted at the contact support 11 is a second contact support in the form of a cover 12. The cover 12 is pivotally mounted at the contact support 11. And for movement between an opened position (FIG. 1) and a closed position (FIG. 2) the cover 12 is, for purposes of locking, reciprocally slidably mounted at and with respect to the first contact support 11, between its closed position and a locked position. The pivotal and reciprocal movements of the cover 12 with respect to the contact support 11 are made possible by a pair of oppositely arranged hinge or support means referred to by reference numeral 13.

The first contact support 11 as well as the cover 12 are preferably manufactured by injection molding of a plastic material. The contact support 11 forms a plate portion 14 (short: plate 14) within which reading contact elements 61 are supported, for example fixed by injection molding. The reading contact elements 61 (are also called reading contacts or simply contacts 61) and form a first set 60 of contact elements (first contact set 60) for contacting card contacts 2 of a first or lower (see FIG. 10) SIM card 1.

As is shown in FIG. 1, the plate portion 14 forms at its two longitudinal sides (perpendicularly extending) longitudinal side edges 21 which form a horizontal longitudinal side support surface 20 which is on a lower level-with respect to a horizontal support surface 23 of the plate 14. At both sides the plate 14 forms each one guide surface 230. Each of said guide surfaces 230 extends perpendicularly between the horizontal support surface 23 and the longitudinal side support surface 20. Said guide surfaces 230 avoid abutment at and on support of the cover 12 on a printed circuit board (not shown) on which the contact support 11 is mounted.

Slots 22 are formed in the plate 14 so as to make it possible that the contact cusps 62 of the (reading) contact elements 61 of the first contact set 60 can extend therethrough.

The contact support 11 further comprises abutment and locking elements 30 and 40, respectively, which are formed at both sides of the plate 14. The abutment element 30 is angularly shaped and comprises a longitudinal wall 33 and a transversal wall 34. In the longitudinal wall 33 a locking recess 32 is formed. The longitudinal wall 33 forms a guiding surface 35 and the transversal wall 34 forms an abutment surface 36 for the smart cards 1. The abutment element 30 further forms a polarizing surface 37 which extends inclined with respect to the longitudinal axis of the contact support 11 and cooperates with the respective polarizing inclination of the first or lower SIM card 1.

The abutment element 40 also comprises a longitudinal wall 43 and a transversal wall 44. The transversal wall 44 forms an abutment surface 46. In the longitudinal wall 43 a locking recess 42 is formed. The two longitudinal side support surfaces 20 are limited by webs 39 at their ends opposite to their ends where the locking recesses 32 and 42 are located.

Figure 2:
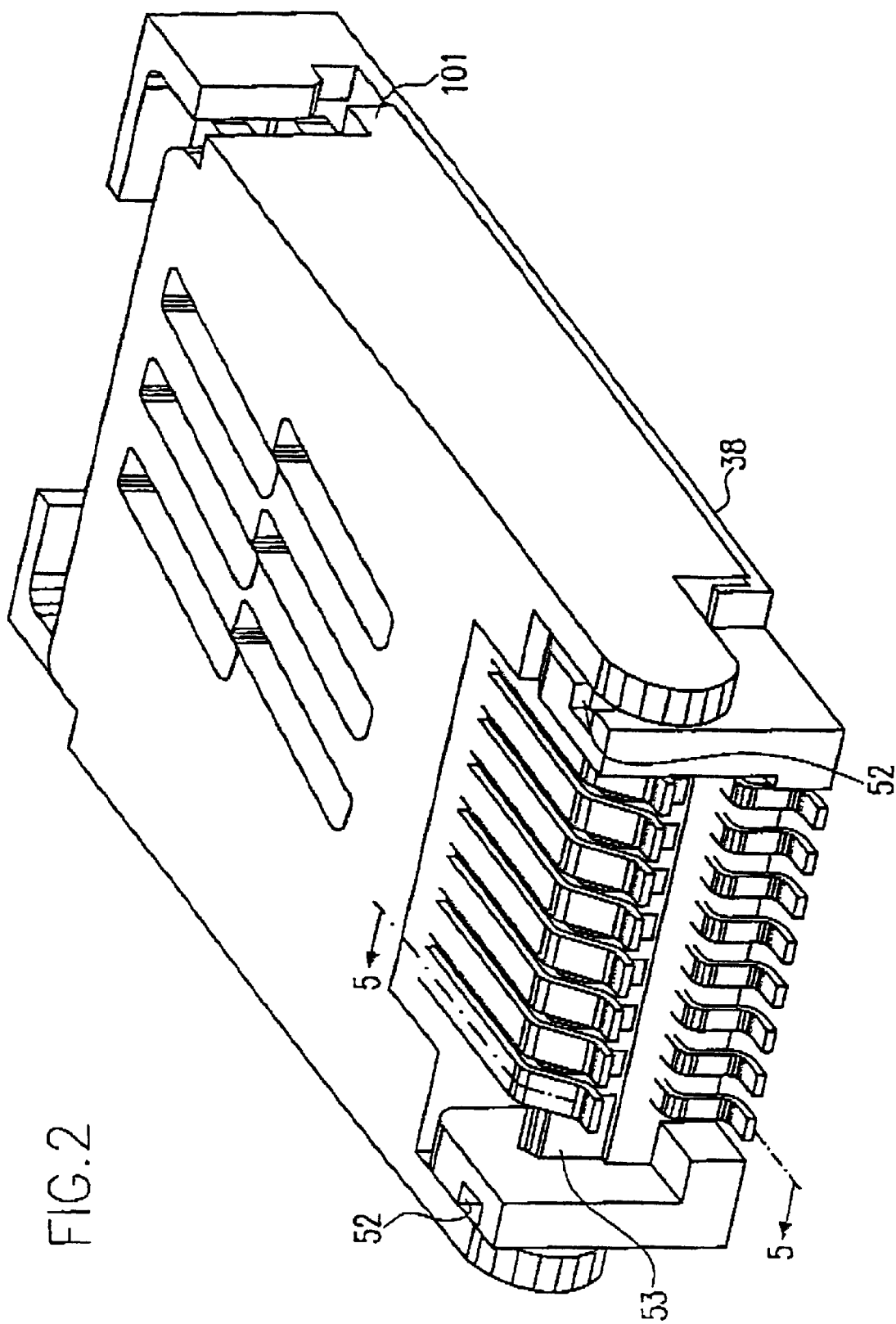
FIG. 2 is a perspective representation of the SIM card connector of FIG. 1 with the cover in the closed position but not yet being slid into its locking position such that a locking switch is not yet closed.
Figure 4:
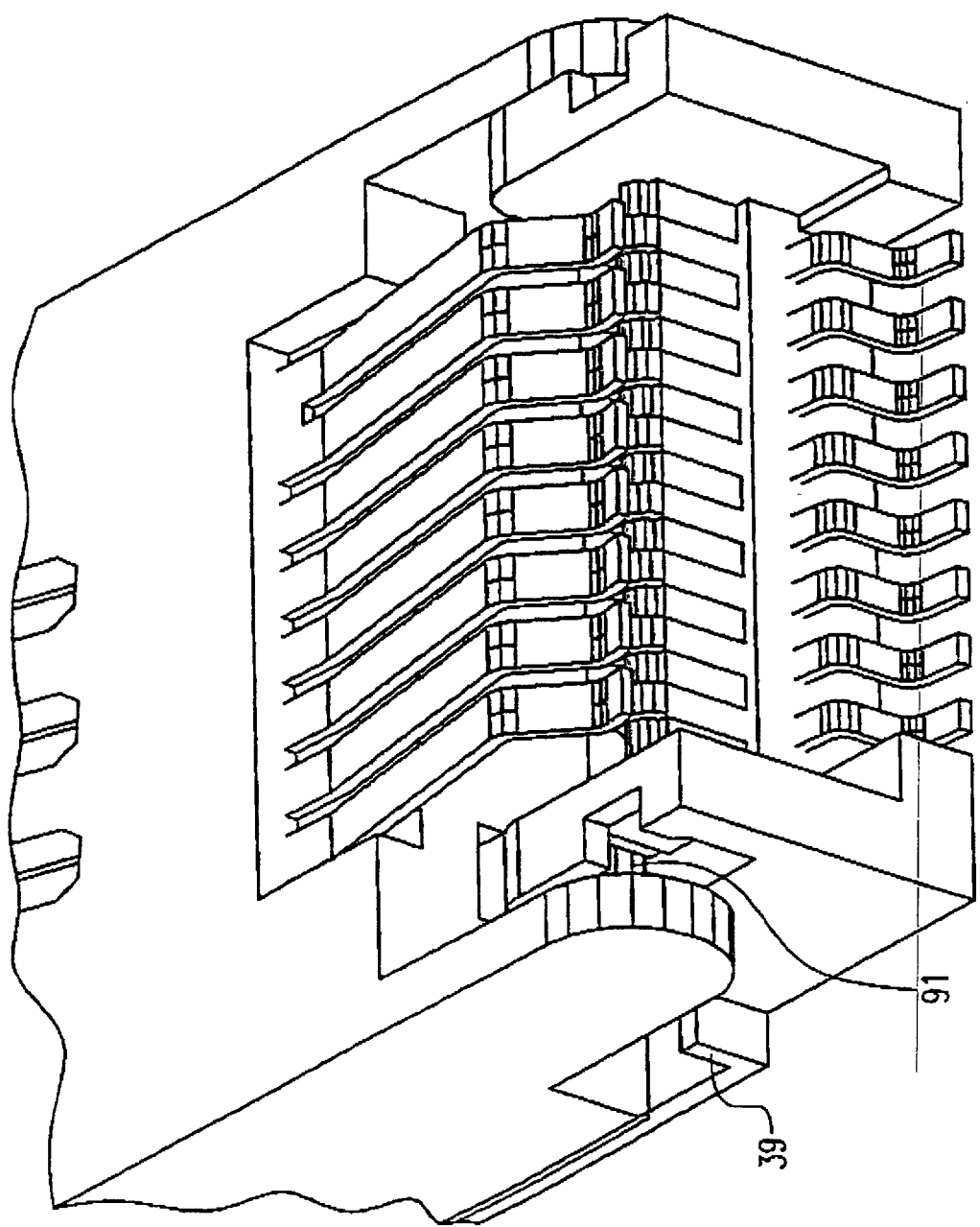
FIG. 4 is a detail of FIG. 2 in a different perspective view.

At a transversal side of the plate 14 which is located opposite to the transversal side forming the abutment elements 30, 40 two transversally spaced bearing means called plate side bearing means (FIG. 8) are provided which cooperate with cover side bearing means (FIG. 4) and thus form the hinge means 13. The plate side bearing means 58 of the hinge means 13 comprise in the embodiment shown to spaced bearing blocks 50 and 51. The bearing blocks 50 and 51 are offset inwardly with respect to the longitudinal side edges 21 and project upwardly with respect to the support surface 23. FIGS. 2, 4 as well as 8–10 disclose the design of the bearing blocks 50, 51 in detail. In each of the bearing blocks 50, 51 an outwardly facing bearing slot 58 is formed. Within each slot 58 of the bearing blocks 50, 51 a bearing pin 91 is mounted which is part of the bearing means of the cover (cover side bearing means) These cover side bearing means will be described in detail below. The bearing pins 91 can be inserted from above into the slots 58 via perpendicular slots 52 (FIG. 8) also provided in the bearing blocks 51. The bearing pins 91 will then be located in the transversal slot 58 (see for instance FIG. 8) so that the cover 12 can be pivoted from its open position shown in FIGS. 1 and 8 into a position shown in FIGS. 2 and 9 referred to below as a closing or closed position. The longitudinal slot 58 is divided by a laterally projecting rib portion (FIG. 8) so that a certain amount of force has to be applied when moving the cover 12 from the closed position shown in FIGS. 2 and 9 into the locking position shown in FIGS. 3 and 101.

According to FIGS. 1, 2 and 5–7 a transversal rib 53 preferably extends between the two bearing blocks 50, 51. Said transversal rib 53 is formed together with the plate 14 and comprises a base portion 55 having a width B (FIGS. 5 and 6) in longitudinal direction and contiguous therewith also a rib portion 56 projecting upwardly and ending in a curved portion 54. The rib portion 56 has a smaller width b than the base portion 55 (see FIG. 6).

In addition to the first contact set 60 located in the plate portion 14, there is a second contact set 80 located in the cover 12. The second contact set 80 are adapted for contacting the card contacts 2 of the upper (see FIG. 7) SIM card 1. The second contact set 80 can be in contact with a third contact set 70 which is also like the first contact set 60 located in the plate portion 14 but separate from the first contact set 60. The third contact set 70 serves as a connection between the second contact set 80 and the contact paths on a printed circuit board. Typically, a bottom side 38 (FIG. 6) of the SIM card connector 10 is located on a printed circuit board.

Generally speaking, the third contact set 70 consists of six identically formed contact elements 71 which are mounted in the plate 14 preferably by injection molding and the third contact set 70 is mounted in said plate 14 between the bearing means 50, 51. As is shown in FIG. 5, each contact element 71 forms a contact cusp 72 which embraces the curved or rounded portion 54 of the rib portion 56. Adjacent to the contact cusp 72, the contact element 71 forms a perpendicularly extending contact arm 73 which extends at the outside of the left surface (FIG. 5) of the rib portion 56. The contact arm 73 is inserted with its lower end into the base portion 55 and extends in an angled section 74 which also is mounted in the base portion, for instance by injection molding. The angled section 74 continues in a horizontal section 75 which extends out of the base portion 55 so as to then form a perpendicular section 76. Perpendicular section 76 ends in a horizontal termination section 77 providing an SMD termination. The design of the sections 75–77 provides for a certain resiliency for the horizontal termination section 77.

It should be noted that the embodiment shown provides besides the six contact elements 71 forming the third contact set 70 to additional switch contact elements which cooperate with the respective additional contact elements 801, 802 (FIG. 11) in the cover 12.

The box-shaped cover 20 is movably mounted at the plate portion 14 by hinge means 13 which comprise, in addition to the plate-side bearing means also cover-side bearing means which include in particular said bearing pins 91 and also linking arms 90 supporting said bearing pins 91.

It should be noted that the mounting of the cover 12 at the plate portion 14 could also be carried out in a cinematic reversal of what is shown; for instance the bearing pins could be provided at the plate portion 14 and the cover 12 could be provided with slots cooperating with said bearing pins. In as much as the linking arms 19 could show a certain degree of resiliency, the shown embodiment is presently preferred.

The cover 12 includes an upper wall 93 in which a plurality of slots 98 is formed. The contact elements 81 of the second contact set 80 partially extend in said slots 98. The cover 12 also includes two side walls 97 extending perpendicularly with respect to the upper wall 93 and also an abutment wall 99 (see FIGS. 3 and 5). Longitudinal ribs 197 and 198 extend into a space defined by the upper wall 93 as well as the side walls 97. Said longitudinal ribs 197, 198 define, see for instance FIG. 6, a second or upper card receiving space 95 and a first or lower card receiving space 96. The upper space 95 is formed by the inwardly located lower surface of the upper wall 93 and the upper surfaces of the longitudinal ribs 197. The lower space 96 is formed by the lower surfaces of the longitudinal ribs 197 and the upper surfaces of the longitudinal ribs 198. The thickness D (see FIG. 5) of the longitudinal ribs 198 located oppositely and extending in longitudinal direction corresponds in substance to the height (see FIG. 1) of the guide surface or offset 230, so as to provide for a flat height or thickness of the smart card connector 18.

Locking means in the form of locking projections 101 are provided—see FIG. 2—at the right ends of the bottom of the cover 12. The locking projections 101 are adapted to come into engagement with the earlier mentioned locking recesses 32, 42 at the time the cover 12 is slidably moved from its closed position (also called inactive-cover closed position) of FIG. 6 into the locking position shown in FIG. 7. (The locking position can also be called an active-cover locked position).

The upper wall 93 forms adjacent to its linkage arms 90 a recess 104 and defines in this manner a support surface 107 (FIG. 5) for planar sections 82 of the contact elements 81 of the second contact set 80. The contact elements 81 extend in the closing position of the cover 12 in accordance with FIG. 7 beyond the contact cusps 72 of the contact elements 71 without making contact. The contact elements 81 are mounted in the cover 12; preferably the contact elements 81 are fixedly mounted due to injection molding of the cover 12. The contact elements 81 extend with their contact cusps 72 beyond the upper surface of the bottom surface of the upper wall 93 so as to come into contact with the second contacts 2 of a second SIM card 1 at the time a second SIM card 1 is inserted into card receiving space 95, thus providing contact with the card contacts 2 of said second SIM card 1.

As shown in FIG. 5, for each of said contact elements 81 adjacent to the planar section 82 an angled section 85 is provided, which ends in an also angled section 86. Said angled section 86 can also be referred to as contact section or simply as termination 86. In fact, termination 86 serves the purpose that in the locking position of FIG. 7 the contact cusp 72 comes into contact with a respective contact element 81. It can be said that the terminations 86 of the second contact elements 81 of the contact set 80 are led or brought out of the cover 12 as "float contacts". As already mentioned, the planar section 82 extends into the plastic material of the cover 12 and then extends into the slot 98 to form there at the end of contact elements 81 a contact cusp.

As mentioned above, besides the contact elements 81 of the second contact set 80 (at the right-hand side of FIG. 1) two switching contact elements 801 and 802 are provided which, as can be clearly seen in FIG. 11, are short-circuited. These contact elements 801 and 802 form together with respective contact elements adjacent to the contact elements 71 of the third contact set 70 a locking switch to provide information with respect to the achievement of the locking position of FIG. 7. Like the other contact elements 81 of the second contact set 80, the contact elements 801 and 802 also referred to as switching contact elements are connected with the contact elements 71 and the contact elements corresponding to contact elements 801, 802, respectively, in case the cover 12 is in its locking position.

INDUSTRIAL APPLICABILITY

Typically, a SIM card connector 10 is used in an apparatus, e.g. a mobile phone, where it is generally placed with its bottom surface 38 on a circuit board (not shown) of said apparatus. The horizontal termination section 77 of the contact elements 71 and also of the switching contact elements are electrically connected with the respective pads on the circuit board. This is done for instance by soldering. The same is true for the contact terminations of the first contact sets 60 which correspond to the horizontal termination sections 77 as is shown in FIG. 8. The contact terminations are also preferably SMD terminations.

So as to be able to insert the two SIM cards 1 the cover 12 is for example pivoted into its opening position shown in FIG. 1. The left or second card 1 is inserted into the card receiving space 94 with the card contacts 2 facing leftward.

The first or right card 1 is inserted into the card receiving space 96 with its card contacts 2 facing rightward. In FIG. 5 it is shown that each of the cards abut at the abutment surface 102. Thereupon, the cover 12 is pivoted into its horizontal closed position shown in FIG. 2 and also FIG. 6. While the cover 12 is in said closing position, the card contacts 2 of the second upper SIM card 1 are already in contact with the respective contact cusps of the second contact set. Only due to the sliding movement of the cover 12 from its closing position according to FIG. 6 into the locking position according to FIG. 7, the contacting of the contact cusps 62 of the first contact set 60 with the respective card contacts 2 of the lower or first SIM card 1 is provided. At the same time, during the transition from the closing position according to FIG. 6 to the locking position according to FIG. 7, the contacting occurs between the contact elements 81 of the second contact set 80 with the contact elements 71 of the third contact set 70. Also, at the same time the contacting is effected for, the switch contact elements 801, 802 with the witch contact elements adjacent the third contact set 70, in a case a loading switch is provided.

FIGS. 12 to 14 describe a second embodiment of a smart card connector based on the first embodiment. Thus, as far as those parts are concerned, which are not shown in FIGS. 12–14, the smart card connector of the second embodiment has the same design as the first embodiment shown in FIGS. 1–11. According to the second embodiment shown in FIGS. 12–14 means are provided, for providing a pre-locking position for the smart card connector, in particular for the cover 12 of the smart card connector. Said means, for providing a pre-locking position comprise preferably slots 401, 402 formed in said abutment elements 300, 400, said slots 401, 402 forming abutment surfaces. The abutment elements 300, 400 include for the reception of said slots 401, 402 longitudinal side walls 334, 330 which extend in longitudinal direction for a larger distance when compared with the first embodiment. Also transverse walls 340, 440 are provided.

At the cover 12, preferably on both sides and preferably in the upper area thereof, holding projections 500 are formed which project laterally as one can see in FIGS. 13 and 14. These holding projections 500 are adapted to come into engagement with the slots 401, 402. So as to locate said holding projections 500 the upper portion of the cover is preferably extended with respect to the length of the cover according to the first embodiment.

Reviewing FIGS. 12, 13 and 14 one recognizes that the cover 12 can be pivoted out of the position shown in FIG. 12 and then, when the cover 12 is closed, it will assume the position shown in FIG. 13. This is the so-called pre-locking position in which the smart card connector is suitable for the "pick and place" function. FIG. 14 discloses the locking position which can be reached by longitudinally sliding the cover 12, wherein (like in the first embodiment) projections not referred to in FIGS. 12–14 will engage in locking recesses 420 of the contact support 11. The length of the slots 401, 402 corresponds preferably to the required longitudinal movement of the cover 12 into the locked position.

The means for providing the pre-locking position could be designed differently than it is shown. For instance, the contact support could be provided with noses which cooperate with respective recesses at the cover. The preferred locking means, i.e. the holding projections 500 and the slots 401, 402 are provided laterally in the respective components, i.e. the cover 12 and the contact support. It is also feasible to provide locking means which can be mounted to said components.

The thickness or height of the projections 101 in FIGS. 1–11 and of the respective projections in FIGS. 12–14 allow that this dimension corresponds to the height of the recess 230 of the support surface 20, so that a small overall height is received.

What is claimed is:

1. A smart card connector adapted to receive two smart cards, i.e. a first smart card having a set of card contacts and a second smart card having a set of card contacts, said smart card connector comprising:

a first contact support carrying a first set of contact elements adapted to contact contact zones of a first smart card, a second contact support in the form of a cover carrying a second set of contact elements for contacting card contacts of the second smart card, and said cover being pivotably mounted on said first contact support between open and closed positions; and wherein means are provided which provide for termination of the contact elements of the second set of contact elements with contacts provided by an apparatus with which the smart card connector is used.

2. The smart card connector of claim 1, wherein the two smart cards are SIM cards, both of which are adapted to be inserted into said cover (12).

3. The smart card connector of claim 1, wherein the cover (12) is a pivotable-slideable-cover.

4. The smart card connector of claim 1, wherein polarizing means are provided in the cover and in the contact support.

5. The smart card connector of claim 1, wherein said apparatus with which the smart card connector is used is a printed circuit board having contact pads which contact the second set of contact elements.

6. The smart card connector of claim 1, wherein a third set of contact elements is provided in the first contact support (11) and is adapted to provide a connection between the second set of contact elements with the pads on a printed circuit board.

7. The smart card connector of claim 6, wherein the connection between the second set of contact elements and the third set of contact elements is only provided for a certain position of the cover (12) with respect to the contact support (40).

8. The smart card connector of claim 7, wherein the contacting between the contact elements of the second contact set (80) and the contact elements of the third contact set (70) occurs when the cover (12) is slideably moved with respect to the contact support (14).

9. The smart card connector of claim 1, wherein said second contact set comprises contact elements having float contact terminations, and wherein means are provided for allowing a reciprocal movement between said opening position and a locked position.

10. The smart card connector of claim 9, wherein the contact between the float contact and the contact elements of the third contact set is open for an open and unlocked cover, and is closed for a cover in the locking position.

11. The smart card connector of claim 10, wherein a switch is provided adapted to sense the locking position of the cover.

12. The smart card connector of claim 11, wherein the switch is activated only if the cover is in its locked position.

13. The smart card connector of claim 1, wherein locking means are provided at the cover (12) adapted to cooperate with counter-locking means at the contact support.

14. The smart card connector of claim 13, wherein the locking means at the cover are provided by projections, while the counter locking means at the contact support are provided by slots in said contact support which allow a slideable movement of the cover from its closed but not yet locked position into a closed and locked position.

15. The smart card connector of claim 1, wherein the cover is adapted to be located in a pre-locking position.

16. The smart card connector of claim 15, wherein said pre-locking position is a position where the cover is not yet locked.

17. A smart card connector adapted to receive two smart cards comprising:
- a first contact support, within which a set of first contact elements is arranged adapted to contact card contacts of a first smart card;
- a second contact support or cover, within which a second set of contact elements is arranged adapted to contact card contacts of a second smart card;
- hinge means for pivotally and slideably mounting said second contact support at said first contact support so that
   a) the second contact support can be pivoted from an open position extending upwardly with respect to the first contact support into a closed position, in which the second contact support is located adjacent to said first contact support and
   b) the second contact support can be moved from the closed position into a locked position, wherein first and second contact supports are locked with each other.

18. The smart card connector of claim 17 wherein the second contact support further comprises first and second card receiving spaces, adapted to receive said first and said second smart card, respectively, with the card contacts of the first smart card facing in the closed and in the locked positions of said first and second contact supports towards the first set of contact elements, while the card contacts of said second smart card face towards the contact elements in said second contact support.

19. The smart card connector of claim 17, wherein the two smart cards are SIM cards, both of which are adapted to be inserted into said cover (12).

20. The smart card connector of claim 17, wherein a third set of contact elements is provided in the first contact support (11) and is adapted to provide a connection between the second set of contact elements with the pads on a printed circuit board.

21. The smart card connector of claim 20, wherein the connection between the second set of contact elements and the third set of contact elements is only provided for a certain position of the cover (12) with respect to the contact support (40).

22. The smart card connector of claim 21, wherein the contacting between the contact elements of the second contact set (80) and the contact elements of the third contact set (70) occurs when the cover (12) is slideably moved with respect to the contact support (14).

23. The smart card connector of claim 17, wherein the cover is adapted to be located in a pre-locking position.

24. The smart card connector of claim 23, wherein said pre-locking position is a position where the cover is not yet locked.

25. The smart card connector of claim 17, wherein a switch is provided adapted to sense the locking position of the cover.

26. The smart card connector of claim 25, wherein the switch is activated only if the cover is in its locked position.

* * * * *

UNITED STATES PATENT AND TRADEMARK OFFICE
CERTIFICATE OF CORRECTION

PATENT NO. : 6,471,550 B2
DATED : October 29, 2002
INVENTOR(S) : Eduard Maiterth et al.

It is certified that error appears in the above-identified patent and that said Letters Patent is hereby corrected as shown below:

Column 1,
Line 16, change "wail" to -- wall --.

Column 2,
Line 44, change "Condition" to -- condition --.

Column 3,
Line 2, change "," to -- ; --;
Line 18, change "shown (it" to -- shown; it --;
Line 19, change "casks" to -- cusps --;
Line 36, insert end quote -- " -- after "(R)".

Column 4,
Line 43, after "means)" insert a period --. --.
Line 55, change "101" to -- 10 --.

Column 7,
Line 19, change "witch" to -- switch --.

Signed and Sealed this

Tenth Day of August, 2004

JON W. DUDAS
*Acting Director of the United States Patent and Trademark Office*